United States Patent [19]

Kidd

[11] Patent Number: 4,990,318

[45] Date of Patent: Feb. 5, 1991

[54] SELECTIVE REMOVAL OF HYDROGEN SULFIDE OVER A NICKEL-PROMOTED ABSORBING COMPOSITION

[75] Inventor: Dennis R. Kidd, Dewey, Okla.

[73] Assignee: Phillips Petroleum Company, Bartlesville, Okla.

[21] Appl. No.: 363,029

[22] Filed: Jun. 7, 1989

[51] Int. Cl.$^5$ .................. C01B 17/16; C01B 31/20
[52] U.S. Cl. ........................... 423/230; 210/749; 502/406; 502/415
[58] Field of Search ............ 423/230, 231; 210/749; 502/406, 415

[56] References Cited

U.S. PATENT DOCUMENTS

| 4,088,736 | 5/1978 | Courty et al. | 423/230 |
| 4,371,728 | 2/1983 | Farha et al. | 585/258 |
| 4,522,709 | 6/1985 | Aldag et al. | 208/216 R |
| 4,725,415 | 2/1988 | Kidd | 423/230 |

FOREIGN PATENT DOCUMENTS

| 0159056 | 10/1985 | European Pat. Off. | 502/406 |
| 79107 | 1/1971 | German Democratic Rep. | 423/230 |
| 0066491 | 4/1984 | Japan | 423/230 |

OTHER PUBLICATIONS

Hackh's Chemical Dictionary, 4th Edition, Grant McGraw Hill Book Co., New York, 1986, pp. 138 and 547.

Primary Examiner—Gary P. Straub
Assistant Examiner—Lori F. Cuomo
Attorney, Agent, or Firm—Charles W. Stewart

[57] ABSTRACT

Hydrogen sulfide is removed from a fluid stream containing hydrogen sulfide and less than 500 ppm of free hydrogen by contacting the fluid stream under suitable absorbing conditions with an absorbing composition consisting essentially of a base material and nickel oxide. Said base material is selected from the group consisting of zinc oxide and zinc titanate, preferably combined with alumina.

14 Claims, No Drawings

SELECTIVE REMOVAL OF HYDROGEN SULFIDE OVER A NICKEL-PROMOTED ABSORBING COMPOSITION

BACKGROUND OF THE INVENTION

This invention relates to an improved process for selectively removing hydrogen sulfide from gaseous streams. More particularly, this invention relates to an improved process for selectively removing hydrogen sulfide from gaseous streams containing less than 500 ppm free hydrogen, by contacting said gaseous streams with a nickel-promoted absorbing composition.

The removal of sulfur from fluid streams can be desirable or necessary for a variety of reasons. If the fluid stream is to be released as a waste stream, removal of sulfur from the fluid stream can be necessary to meet the sulfur emmission requirements set by various air pollution control authorities. Such requirements are generally in the range of about 10 ppm to 500 ppm of sulfur in the fluid stream. If the fluid stream is to be burned as a fuel, removal of sulfur from the fluid stream can be necessary to prevent environmental pollution. If the fluid stream is to be processed, removal of the sulfur is often necessary to prevent the poisoning of sulfur sensitive catalysts or to satisfy other process requirements.

A variety of methods employing regenerable, solid contact materials are known for removing sulfur from a fluid stream when the sulfur is present as hydrogen sulfide. For example, U.S. Pat. No. 4,371,728 discloses a composition comprising zinc, titanium and at least one metal promoter which is an effective absorbing composition for hydrogen sulfide and which possesses the property of being regenerable to the original absorbing composition state in the presence of oxygen when fully sulfided. Also, U.S. Pat. No. 4,725,415 discloses a composition comprising zinc titanate, alumina, at least one metal promoter selected from tungsten and molybdenum, and at least one metal promoter selected from Group VIII of the Periodic Table which is an effective absorbing composition for hydrogen sulfide and which possesses the property of being regenerable to the original absorbing composition state in the presence of oxygen when fully sulfided.

Although the compositions disclosed in these United States patents are effective absorbing compositions for hydrogen sulfide, it has been found that when the hydrogen sulfide containing fluid stream has a free hydrogen content below about 500 ppm, many of the promoting metals employed in these compositions effectively oxidize significant amounts of the hydrogen sulfide to sulfur dioxide. The resulting sulfur dioxide is not absorbed by these patented compositions and, thus, passes unabsorbed through the contact material. In view of the fact that environmental concerns are focused on the total amount of sulfur contained in an effluent stream, and not just the amount of hydrogen sulfide, passing sulfur dioxide through the contact material and out to the environment is not acceptable under current environmental standards.

SUMMARY OF THE INVENTION

It is thus an object of the present invention to provide an improved absorbing composition for selectively removing hydrogen sulfide from fluid streams containing hydrogen sulfide and less than 500 ppm of free hydrogen without producing a treated fluid stream containing significant amounts of sulfur dioxide. It is a further object of this invention to provide an improved removal or absorbing composition which possesses the property of being regenerable to the original absorbing composition state in the presence of oxygen when fully sulfided.

It has been found, in accordance with the present invention, that nickel oxide will not oxidize hydrogen sulfide to sulfur dioxide when contacted with a fluid stream containing hydrogen sulfide and less than 500 ppm of free hydrogen under the conditions of the process of the present invention. An absorbing composition promoted only with nickel oxide will, however, effectively absorb substantially all of the hydrogen sulfide contained in such a fluid stream.

DETAILED DESCRIPTION OF THE INVENTION

Thus, in accordance with the present invention, an absorbing composition consisting essentially of a base material and nickel oxide is utilized to selectively remove hydrogen sulfide from a fluid stream containing hydrogen sulfide and less than 500 ppm of free hydrogen. The base material is selected from the group consisting of zinc oxide and zinc titanate, preferably combined with alumina. Once the absorbing composition of the present invention has been prepared, fluid streams containing hydrogen sulfide and less than 500 ppm of free hydrogen are contacted with the absorbing composition under suitable absorbing conditions to substantially reduce the concentration of hydrogen sulfide in the fluid stream without significantly increasing the concentration of sulfur dioxide in the fluid stream.

It is believed that the hydrogen sulfide is being absorbed by the absorbing composition and thus the terms "absorption process" and "absorbing composition" are utilized for the sake of convenience. However, the exact chemical phenomenon occurring is not the inventive feature of the process of the present invention and the use of the term "absorb" in any form is not intended to limit the present invention.

The selective absorption process is preferably carried out in cycles comprising an absorption period and a period for the regeneration of the sulfided absorbing composition. The absorption period comprises contacting a gaseous stream which contains hydrogen sulfide and less than 500 ppm of free hydrogen with the absorbing composition to thereby selectively remove hydrogen sulfide from the gaseous stream. The absorbing composition becomes sulfided during the absorption period. When the absorbing composition becomes sulfided to the point that regeneration is desirable, preferably when it is nearly completely sulfided, an oxygen-containing gas is passed in contact with the absorbing composition to regenerate the absorbing composition and to convert the absorbed sulfur to a sulfur oxide The chemical changes that are believed to occur in the absorbing composition during this cyclic process are summarized in the following equations:

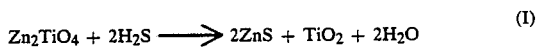
$$Zn_2TiO_4 + 2H_2S \longrightarrow 2ZnS + TiO_2 + 2H_2O \quad (I)$$

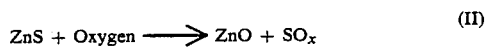
$$ZnS + Oxygen \longrightarrow ZnO + SO_x \quad (II)$$

$$2ZnO + TiO_2 \longrightarrow Zn_2TiO_4 \quad (III)$$

-continued $$ZnO + H_2S \longrightarrow ZnS + H_2O \quad (IV)$$

$$ZnS + Oxygen \longrightarrow ZnO + SO_x \text{ and,} \quad (V)$$

$$NiO + H_2S \longrightarrow NiS + H_2O \quad (VI)$$

$$NiS + Oxygen \longrightarrow NiO + SO_x \quad (VII)$$

Other objects and advantages of the invention will be apparent from the foregoing description of the invention and the appended claims as well as from the detailed description of the invention which follows.

The absorbing composition of the present invention may be utilized to remove hydrogen sulfide from any suitable gaseous stream. The hydrogen sulfide may be produced by the hydrodesulfurization of organic sulfur compounds or may be originally present in the gaseous stream as hydrogen sulfide. Examples of such suitable gaseous streams include light hydrocarbons, such as methane, ethane, and natural gas, and gases derived from such light hydrocarbons; gases derived from petroleum products and products from extraction and/or liquefaction of coal and lignite; gases derived from tar sands and shale oil; coal derived synthesis gas; gases such as hydrogen and nitrogen; gaseous oxides of carbon; steam; the inert gases such as helium and argon; and product gas streams, from other hydrogen sulfide removal processes, that contain residual hydrogen sulfide due to the incomplete removal of hydrogen sulfide by the prior process. Gases that adversely affect the removal of hydrogen sulfide and which should be absent from the gaseous streams being processed are oxidizing agents, examples of which include air, molecular oxygen, the halogens, and the oxides of nitrogen.

Although the absorbing composition of the present invention is effective in the removal of hydrogen sulfide from all suitable gaseous streams, it is especially effective in the removal of hydrogen sulfide from gaseous streams that contain less than about 500 ppm of free hydrogen, wherein it is desirable not to promote the oxidation of the hydrogen sulfide contained in such gaseous streams to sulfur dioxide. Examples of such suitable gaseous streams include acid gas streams derived from methane, ethane, and natural gas; olefin streams; and product gas streams, from other hydrogen sulfide removal processes, that contain residual hydrogen sulfide due to the incomplete removal of hydrogen sulfide by the prior process.

The absorbing composition of the present invention may be utilized to remove hydrogen sulfide from olefins such as ethylene. This process, however, should be carried out in the absence of free hydrogen to avoid hydrogenation. Olefin streams should not be hydrodesulfurized as this may result in undesirable hydrogenation of at least a portion of the olefins to paraffins.

The absorbing composition employed in the process of the present invention is a composition consisting essentially of a base material selected from the group consisting of zinc oxide and zinc titanate, preferably combined with alumina, and nickel oxide.

The absorbing composition employed in the process of the present invention may be prepared by any suitable method known in the art. When the absorbing composition consists essentially of zinc oxide and nickel oxide, or zinc titanate and nickel oxide, the composition may be prepared by any method known in the art by which the nickel oxide promoter may be combined with the zinc oxide or zinc titanate base material. Examples of such methods include coprecipitation, incipient wettness impregnation, spray impregnation, and solid mixing. These methods are well known in the art and therefore will not be further discussed herein. Once the absorbing composition has been prepared, it may be formed into a suitable contact material by any suitable method known in the art. Examples of such suitable methods include extrusion, pelletization, tabletting, and spray drying.

The zinc oxide used in the preparation of the absorbing composition may be either in the form of zinc oxide, or in the form of one or more zinc compounds that are convertible to zinc oxide under the conditions of preparation described herein. Examples of such zinc compounds include zinc sulfide, zinc sulfate, zinc hydroxide, zinc carbonate, zinc acetate, and zinc nitrate. Preferably, the zinc oxide is in the form of powdered zinc oxide.

The zinc titanate used in the preparation of the absorbing composition is preferably prepared in accordance with the methods disclosed in U.S. Pat. No. 4,522,709 beginning on line 55 of column 2 and continuing to line 27 of column 3, which disclosure is incorporated herein by reference.

When the absorbing composition employed in the process of the present invention consists essentially of zinc titanate, alumina, and nickel oxide, the composition is preferably prepared by first preparing zinc titanate which is then reduced to a small size. The resulting zinc titanate is then mixed with a hydrosol of a suitable acidic material comprising alumina. A suitable base is then added to the mixture to form a hydrogel. The resulting hydrogel is dried slowly and calcined to form a hydrogel derived composition of zinc titanate and alumina. Nickel oxide is then added to the hydrogel derived composition of zinc titanate and alumina, and the promoted composition is again dried and calcined to form the absorbing composition employed in the process of the present invention.

In accordance with this preferred method, zinc titanate is prepared in accordance with the methods disclosed in U.S. Pat. No. 4,522,709 as previously discussed herein. The resulting zinc titanate is then reduced to a size that is suitable for mixing with a hydrosol of alumina. Any suitable method for reducing the particle size of the zinc titanate to a size suitable for mixing with a hydrosol of alumina may be used. An example of such a method is the treatment of the zinc titanate in an ultrasonic disrupter. The zinc titanate may be reduced to any suitable size, with a particle size in the range of about 1.0 micron to about 10 microns being preferred.

The resulting zinc titanate, having a fine particle size, is mixed with a hydrosol of alumina. Any suitable form of alumina may be utilized. Alumina hydrate is particularly preferred because a hydrosol of alumina hydrate is readily converted to a hydrogel and then to the oxide phase after calcination.

After the zinc titanate has been thoroughly mixed into the hydrosol, a suitable base is added to convert the hydrosol to a hydrogel. Any suitable base such as alkali metal hydroxides, ammonium hydroxide, or urea may be utilized. Ammonium hydroxide is the preferred base because it does not have any metallic component that would remain in the hydrogel.

The resulting hydrogel is dried slowly so that water will not be removed so rapidly that the hydrogel structure will collapse which would result in an excessive loss of pore volume and surface area in the finished hydrogel derived absorbing composition. Any suitable drying time can be utilized which does not result in too rapid a removal of water. Preferably, the drying time is in the range of about 8 hours to about 24 hours.

Any suitable temperature can be utilized for the drying of the zinc titanate and alumina hydrogel but again the temperature should be such that too rapid a removal of water does not result. The temperature is preferably in the range of about 35° C. to about 150° C. The most preferred drying condition is to start the drying process at about 80° C. and increase the temperature slowly to about 120° C. during the drying time.

After the zinc titanate and alumina hydrogel has been dried, it is then calcined in the presence of free oxygen to form the hydrogel derived absorbing composition. Any suitable free oxygen-containing gas may be utilized, with air being preferred because of its availability. Also, any suitable time and temperature for calcining may be utilized with a preferred time being about two hours and a preferred temperature being in the range of about 425° C. to about 650° C. and more preferably in the range of about 480° C. to about 600° C. Although the dried zinc titanate and alumina hydrogel can be placed directly into a preheated furnace or kiln for calcining, it is preferable for the hydrogel to attain its final temperature during a heating period of about two hours.

When the absorbing composition employed in the process of the present invention consists essentially of zinc oxide, alumina, and nickel oxide, the composition is preferably prepared by initially mixing zinc oxide, alumina, and a dilute acid, thereby forming a peptized composition of zinc oxide and alumina. The peptized composition of zinc oxide and alumina is then dried and calcined to form the base material of the absorbing composition. Nickel oxide or its precursor is then added to the base material, and the promoted composition is again dried and calcined to form the absorbing composition employed in the process of the present invention.

Alternatively, the nickel oxide or its precursor may be added to the zinc oxide and alumina mixture during the formation of the peptized composition of zinc oxide and alumina, thus reducing the number of times the composition must be dried and calcined to form the absorbing composition.

In accordance with the preferred method described above, powdered zinc oxide and alumina-hydrate are initially combined in a mixer. To achieve the desired dispersion of these materials, the materials are blended until a homogeneous mixture is formed. Generally, this mixing time will be in the range of about 1.0 minute to about 45 minutes, and will preferably be in the range of about 2.0 minutes to about 15 minutes.

When the zinc oxide and alumina have been blended within the mixer for the desired amount of time, a dilute acid is then added, with continued mixing, to the resulting mixture to thereby form a peptized composition of zinc oxide and alumina. The dilute acid may be added to the resulting mixture by any suitable method. Preferably, the dilute acid is added to the resulting mixture by spraying it within the mixer during continued mixing.

In an alternate embodiment of the present invention, the zinc oxide and alumina base material is prepared by initially forming a hydrogel of zinc oxide and alumina. In accordance with this embodiment, an alumina compound and a dilute acid are intitially combined with stirring to form an acidic solution comprising alumina. Zinc oxide is then added to the solution to form a hydrogel of zinc oxide and alumina.

Any suitable form of alumina may be used in the preparation of the absorbing composition employed in the process of the present invention. Examples of suitable forms of alumina include Gibbsite, Bayerite, and boehmite. Preferably, the alumina is in the form of boehmite.

Any suitable acid may be used in the preparation of the absorbing composition. Examples of suitable acids include nitric acid, acetic acid, sulfuric acid, and hydrochloric acid, with acetic acid being presently preferred. The acid concentration in the dilute acid employed in the preparation of the absorbing composition will generally be in the range of about 1.0 Weight-% to about 15 weight-%, and will preferably be in the range of about 1.0 weight-% to about 5.0 weight-%, said weight-% being expressed in terms of the weight of the concentrated acid based upon the total weight of the dilute acid.

Regardless of which method is used to form the zinc oxide and alumina base material, the resulting composition is then dried and calcined. Any suitable drying time can be utilized to dry the composition of zinc oxide and alumina. The drying time is preferably in the range of about 0.5 hour to about 4 hours, and is most preferably in the range of about 1 hour to about 2 hours.

Any suitable temperature can be utilized to dry the composition of zinc oxide and alumina. The drying temperature is preferably in the range of about 75° C. to about 300° C., and is most preferably in the range of about 90° C. to about 250° C.

After the composition of Zinc oxide and alumina is dried, it is then calcined in the presence of free oxygen to form the base material for the absorbing composition employed in the process of the present invention. Any suitable free oxygen-containing gas may be utilized, with air being preferred because of its availability. Also, any suitable time and temperature for calcining may be utilized. Generally, the calcination time will be in the range of about 0.5 hour to about 4 hours, and will preferably be in the range of about 1 hour to about 2 hours. The calcination temperature will generally be in the range of about 375° C. to about 750° C. and will preferably be in the range of about 500° C. to about 700° C.

The absorbing compositions employed in the process of the present invention that consist essentially of a base material selected from zinc oxide and zinc titanate, alumina, and nickel oxide can contain any suitable amount of alumina. The amount of alumina in these absorbing compositions will generally be in the range of about 10 weight-% to about 50 weight-%, and will more preferably be in the range of about 30 weight-% to about 40 weight-%, said weight-%'s being expressed in terms of the weight of the alumina in comparison to the total weight of the absorbing composition.

Nickel oxide may be added to the absorbing composition of the present invention in the form of elemental nickel, nickel oxide, and/or nickel-containing compounds that are convertible to nickel oxides under the calcining conditions described herein. Some examples of such nickel-containing compounds include nickel acetates, nickel carbonates, nickel nitrates, nickel oxides, nickel sulfates, nickel thiocyanates, and mixtures of two or more thereof.

The elemental nickel, nickel oxide, and/or nickel-containing compounds can be added to the absorbing composition by any method known in the art. One such method is the impregnation of the base material with a solution, either aqueous or organic, that contains the elemental nickel, nickel oxide, and/or nickel-containing compounds. After the elemental nickel, nickel oxide, and/or nickel-containing compounds have been added to the base material, the resulting composition is dried and calcined, as described hereinafter.

The elemental nickel, nickel oxide, and/or nickel-containing compounds can be included as components in the preparation of the base materials, or they may be added to the formed base materials after the base materials have initially been dried and calcined. In the event the elemental nickel, nickel oxide, and/or nickel-containing compounds are included during the preparation of the base material, then the base material is formed, dried, and calcined in the manners previously describe herein.

In the event the elemental nickel, nickel oxide, and/or nickel-containing compounds are added to the base material after it has initially been dried and calcined, then the promoted base material is again dried and calcined following the addition of the promoting metals. The promoted base material is generally dried at a temperature in the range of about 75° C. to about 300° C., more preferably in the range of about 90° C. to about 250° C., and for a drying time generally in the range of about 0.5 hour to about 8 hours, more preferably in the range of about 3 hours to about 5 hours. The dried, promoted base material is then calcined in the presence of free oxygen at a temperature generally in the range of about 375° C. to about 750° C., more preferably in the range of about 500° C. to about 700° C., until volatile matter is removed and the elemental nickel and/or the nickel-containing compounds are substantially converted to nickel oxides. The time required for this calcining step will generally range from about 0.5 hour to about 4 hours, and will preferably be in the range of about 1 hour to about 2 hours.

The nickel oxide will generally be present in the absorbing composition in an amount ranging from about 0.1 weight-% to about 15 weight-%, and will more preferably be in the range of about 2 weight-% to about 7.5 weight-%, said weight-%'s being expressed in terms of nickel oxide based upon the total weight of the absorbing composition.

The processes of the present invention can be carried out by means of any apparatus whereby there is achieved an alternate contact of the absorbing composition with the gaseous feed stream and, thereafter, of the absorbing composition with an oxygen-containing gas which is utilized to regenerate the absorbing composition. The process is in no way limited to the use of a particular apparatus. The process of this invention can be carried out using a fixed bed of absorbing composition, a fluidized bed of absorbing composition, or a moving bed of absorbing composition. Presently preferred is a fixed bed of absorbing composition.

In order to avoid any casual mixing of the gaseous feed stream containing hydrogen sulfide with the oxygen-containing gas utilized in the regeneration step, provision is preferably made for terminating the flow of the gaseous feed stream to the reactor and subsequently injecting an inert purging fluid such as nitrogen, carbon dioxide or steam. Any suitable purge time can be utilized but the purge should be continued until all hydrocarbon and/or hydrogen sulfide are removed. Any suitable flow rate of the purge fluid may be utilized. Presently preferred is a purge fluid flow rate in the range of about 800 GHSV to about 1200 GHSV.

Any suitable temperature for the processes of the present invention may be utilized. The temperature will generally be in the range of about 150° C. to about 600° C. and will more preferably be in the range of about 200° C. to about 450° C.

Any suitable temperature may be utilized to regenerate the absorbing composition from its sulfided form back to the original absorbing composition form. The temperature will generally be in the range of about 370° C. to about 815° C. As part of this invention, however, it has been discovered that the higher temperatures required to intiate the regeneration of ZnS to ZnO (i.e. about 650° C. and higher) has an adverse effect on the amount of sulfur dioxide that is produced during the subsequent absorption cycle. Due to the fact that the regeneration of NiS to NiO is an exothermic reaction, and the fact that this reaction is initiated at a lower temperature (i.e. about 425° C.), the presence of nickel oxide in the absorbing composition employed in the process of the present invention allows the regeneration to occur at a lower temperature, thereby preventing the adverse effect describe above. Thus, the regeneration temperature is preferably in the range of about 425° C. to about 600° C., most preferably about 425° C., to effect the regeneration within a reasonable time while not adversely affecting the production of sulfur dioxide in the treated gaseous feed stream.

Any suitable pressure can be utilized for the processes of the present invention. The pressure of the gaseous feed stream being treated is not believed to have an important effect on the absorption process of the present invention, and will generally be in the range of from about atmospheric to about 2,000 psig during the treatment.

Any suitable residence time for the gaseous feed stream in the presence of the absorbing composition of the present invention can be utilized. The residence time expressed as volumes of gas at standard temperature and pressure per volume of absorbing composition per hour will generally be in the range of about 10 to about 10,000 and will more preferably be in the range of about 250 to about 2500.

When the absorbing composition is completely sulfided it will no longer combine with the hydrogen sulfide in the manner set forth in equations (I), (IV), and (VI). When this condition occurs, hydrogen sulfide will begin to appear in the effluent flowing from the reaction and this will be an indication that the absorbing composition should preferably be regenerated. The time required for the absorbing composition to become completely sulfided will generally be a function of the concentration of sulfur in the feedstock and feed rate employed.

When the absorbing composition becomes substantially completely sulfided, the absorbing composition is typically regenerated by terminating the flow of feed to the reactor and purging with an inert fluid such as nitrogen to remove any combustibles. A free oxygencontaining gas is then introduced to the reactor for the purpose of oxidizing the zinc sulfide and the nickel sulfide in accordance with equations (II), (V), and (VII). Also, with respect to the absorbing compositions containing zinc titanate, at the temperature at which the oxidation of the zinc sulfide is effected, the zinc oxide thus produced recombines with the titanium dioxide to resynthesize the original zinc titanate in accordance with equation (111).

The amount of oxygen supplied to the reactor during the regeneration step will generally be sufficient to at least substantially remove sulfur from the absorbing composition. The regeneration step is generally conducted at about atmospheric pressure. The temperature for the regeneration step is generally maintained in the range of about 370° C. to about 815° C., and is more preferably maintained at about 425° C in order to both oxidize the zinc sulfide and convert the zinc oxide and titanium dioxide to zinc titanate within a reasonable time.

The following examples are presented in further illustration of the invention.

EXAMPLE I

In this example the experimental procedure for the removal of hydrogen sulfide from gas streams containing less than about 500 ppm of free hydrogen by means of various solid sorbent materials is described.

The tests were carried out in a single reactor unit comprising a 20 mm O.D. Quartz reactor and a 2 mm Thermocouple well. The reactor, which was maintained at a pressure of about 1.7 psig, was operated in a fixed bed down flow mode using 10 grams of sorbent. Within the reactor, the sorbent was heated to the reaction temperature in a stream of nitrogen. When the desired temperature was attained, the nitrogen flow was stopped, and the simulated sulfur plant gas and, when used, water vapor flows were started. The water vapor was generated by pumping water through a heated line that was connected to the top of the reactor. The reaction was carried out at a reaction temperature of about 538° C. and a gas hourly space velocity of 2050 cc/cc catalyst/hour. The composition of the simulated sulfur plant gas was as follows: 2.1 volume-% hydrogen sulfide, 26.2 volume-% carbon dioxide, and 71.7 volume-% nitrogen.

The progress of the absorption was followed by measuring the concentration of hydrogen sulfide and/or the sulfur dioxide in the reactor effluent after the water vapor had been condensed and removed from the effluent. The concentration of hydrogen sulfide and/or sulfur dioxide was measured with Draeger tubes that were suited to the concentration ranges encountered.

Once the sorbents became fully sulfided, as evidenced by hydrogen sulfide breakthrough, the flow of the simulated sulfur plant gas to the reactor was halted and the reactor was purged with nitrogen for a period of about 20 minutes while being heated to a regeneration temperature of about 632° C. The sulfided sorbent was then regenerated in the presence of air for about 1.5 hours. Following regeneration, the reactor was again purged with nitrogen for about 40 minutes while being cooled back down to the reaction temperature of about 538° C. The nitrogen purge was then halted and the simulated sulfur plant gas was fed to the reactor to begin another absorption cycle.

EXAMPLE II

This example describes the sorbent materials which were tested in accordance with the procedures set forth in Example I.

Sorbent A: comprised $ZnO/Al_2O_3$ with 50 weight-% ZnO and 50 weight-% $Al_2O_3$. Sorbent A was prepared in the following manner: First, ZnO powder (Lot 052579; Alfa Products Division, Morton Thiokol, Inc.; Danvers, Mass.) was ground to a particle size of −200 mesh. Next, about 61.2 grams of α-alumina monohydrate were dispersed in 500 mL of water with stirring. 4.4 mL of concentrated nitric acid were then added to the solution to form an acidic solution comprising alumina. Next, a ZnO hydrosol was prepared by slurrying 50.5 grams of the ground ZnO powder in 150 ml of water. After stirring the acidic solution comprising alumina for about 10 minutes, the ZnO hydrosol was added, with rapid stirring, to the acidic solution comprising alumina, and a hydrogel of zinc oxide and alumina was quickly formed. The hydrogel of zinc oxide and alumina was then transferred to an evaporating dish and dried at a temperature of about 120° C. for about 12 hours. The dried hydrogel was then calcined in air at 500° C. for a period of 3 hours. The BET/Nsurface area of Sorbent A was about 60 m$^2$/g.

Sorbent B: comprised $Ni/Mo/P/ZnO/Al_2O_3$ with 1.08 weight-% Ni (as NiO), 5.40 weight-% Mo (as $MoO_3$), 0.57 weight-% P (as $P_2O_5$), 47.6 weight-% ZnO and 47.6 weight-% Al-O-. Sorbent B was prepared in the following manner: First, a solution of promoting metals was prepared by combining about 16.4 grams of $NiCO_3$ (Tech Lot 731215; Fisher Scientific Company; Pittsburg, Pa.), about 51.0 grams of $MoO_3$ (Lot KLNY; Mallinckordt, Inc.; St. Louis, Mo.), and about 9.8 grams of $H_3PO_4$ (85%) (Lot 61257; Merck Sharp & Dohme/Isotopes; St. Louis, Mo.) in about 80 mL of deionized water. This solution was refluxed for about 3.5 hours. About 11.0 grams of Sorbent A was then impregnated, by incipient wettness, with 1.92 grams of the solution of promoting metals and about 3.68 grams of water. The resulting composition was then dried overnight at a temperature of about 160° C. and, thereafter, calcined in air at 500° C. for about 3 hours. The BET/N$_2$ surface area of Sorbent B was 55 m$^2$/g.

Sorbent C: comprised $Fe/ZnO/Al_2O_3$ with 6.3 weight-% Fe (as $Fe_2O_3$), 46.8 weight-% ZnO and 46.8 weight-% $Al_2O_3$. Sorbent C was prepared in the same manner as Sorbent , except that 3.78 grams of Fe(NO$_3$)$_3$·9H$_2$O and 5.0 grams of water were used to impregnate 11.0 grams of Sorbent A.

Sorbent D: comprised $Ni/ZnO/Al_2O_3$ with 5.78 weight-% Ni (as NiO), 47.2 weight-% ZnO and 47.2 weight-% $Al_2O_3$. Sorbent D was prepared in the same manner as Sorbent B, except that 2.60 grams of Ni(NO$_3$)$_2$·6H-O and 5.0 grams of water were used to impregnate 11.0 grams of Sorbent A.

Sorbent E: comprised $Cu/ZnO/Al_2O_3$ with 4.7 weight-% Cu (as CuO), 47.6 weight-% ZnO, and 47.6 weight-% Al-O-. Sorbent E was also prepared in the same manner as Sorbent B, except that 1.99 grams of Cu(NO$_3$)$_2$·6H$_2$O and 5.0 grams of water were used to impregnate 11.0 grams of Sorbent A.

Sorbent F: comprised $Co/ZnO/Al_2O_3$ with 4.5 weight-% Co (as CoO), 47.8 weight-% ZnO, and 47.8 weight-% $Al_2O_3$. Sorbent F was also prepared in the same manner as Sorbent B, except that 2.59 grams of Co(NO$_3$)$_2$·6H$_2$O and 5.0 grams of water were used to impregnate 11.0 grams of Sorbent A.

EXAMPLE III

This example illustrates the use of the sorbents described in Example 11 within the procedure described in Example 1 for the removal of H-S from a simulated sulfur plant gas. The results are presented as a function of the amount of hydrogen sulfide and the amount of sulfur dioxide present in the effluent gaseous stream (measured in ppm) as of the time of the reading. The cycle number listed is the number of the absorption cycle in which the reading was taken during an ongoing test comprising repeated cycles of absorption and regeneration. The test results are summarized in Table I.

TABLE 1

| Run | Sorbent | Promoter | Time | H2S | SO2 | Time | H2S | SO2 | Time | H2S | SO2 |
|---|---|---|---|---|---|---|---|---|---|---|---|
| | | | Cycle 1 | | | Cycle 4 | | | Cycle 18 | | |
| 1 (Control) | A | None | 5[a] | 5[b] | 200[c] | 1 | —[d] | 5000+ | 1 | — | 5000+ |
| | | | 10 | 25 | 100 | 9 | 10 | 1500 | 3 | 5 | — |
| | | | 19 | — | 100 | 10 | 10 | — | 6 | 5 | — |
| | | | 45 | 110 | — | 11 | 40 | — | 7 | 150+ | — |
| | | | | | | 13 | 1300 | — | 8 | 2000+ | — |
| | | | Cycle 1 | | | Cycle 4 | | | Cycle 17 | | |
| 2 (Control) | B | Ni,Mo,P | 1 | — | 2000 | 1 | — | 5000+ | 1 | — | 5000+ |
| | | | 2 | 20 | — | 5 | 15 | — | 5 | 15 | — |
| | | | 9 | — | 2000 | 16 | 10 | — | 10 | — | 4000 |
| | | | 40 | 10 | — | 26 | 5 | — | 17 | 15 | — |
| | | | 44 | 50 | — | 32 | 600 | — | 22 | 15 | — |
| | | | | | | | | | 25 | 700 | — |
| | | | Cycle 1 | | | | | | Cycle 16 | | |
| 3 (Control) | C | Fe | 1 | — | 2000 | | | | 1 | — | 5000+ |
| | | | 2 | — | 1500 | | | | 10 | — | 5000+ |
| | | | 19 | — | 250 | | | | 14 | 0 | — |
| | | | | | | | | | 16 | — | 1500 |
| | | | | | | | | | 23 | 0 | 1200 |
| | | | | | | | | | 36 | 35 | — |
| | | | | | | | | | 44 | 200 | — |
| | | | Cycle 1 | | | Cycle 2 | | | Cycle 16 | | |
| 4 (Invention) | D | Ni | 16 | — | 10 | 1 | — | 250 | 4 | — | 60 |
| | | | 21 | 6 | — | 4 | — | 50 | 9 | 6 | — |
| | | | 32 | 7 | — | 7 | — | 50 | 18 | 6 | — |
| | | | 40 | — | 5 | 31 | — | 10 | 29 | 8 | — |
| | | | 43 | 7 | — | 45 | 10 | — | 33 | — | 20 |
| | | | Cycle 1 | | | Cycle 2 | | | Cycle 16 | | |
| 5 (Control) | E | Cu | 2 | — | 10 | 7 | — | 6000+ | 6 | — | 5000 |
| | | | 3 | 1 | — | 9 | — | 13000 | 16 | 0 | — |
| | | | 13 | — | 100 | 11 | — | 6000+ | 41 | — | 5000 |
| | | | 21 | 1 | 8 | 21 | — | 9000 | 42 | 0 | — |
| | | | 43 | 1 | — | 35 | — | 5000 | | | |
| | | | Cycle 1 | | | | | | Cycle 16 | | |
| 6 (Control) | F | Co | 10 | 0 | 5000+ | | | | 5 | 0 | — |
| | | | 20 | 0 | — | | | | 10 | 5 | — |
| | | | 31 | 20 | — | | | | 21 | 15 | — |
| | | | 40 | 30 | — | | | | 24 | 50 | — |
| | | | 45 | 100 | — | | | | 25 | 200+ | — |

[a]Expressed in minutes.
[b]Expressed in ppm.
[c]Expressed in ppm.
[d]an Em dash (—) indicates that no reading was taken.

A comparison of the results set forth in Table 1 clearly shows that an absorbing composition promoted only with nickel oxide (Run 4) is superior to other promoters in absorbing hydrogen sulfide from a fluid stream containing hydrogen sulfide and less than 500 ppm of free hydrogen without oxidizing significant amounts of the hydrogen sulfide to sulfur dioxide. In particular, a review of Runs 1–3 and 5–6 shows that the other promoters were oxidizing a significant amount of the hydrogen sulfide contained in the fluid stream to sulfur dioxide and then passing the produced sulfur dioxide, unabsorbed, with the remaining effluent gas.

While this invention as been described in detail for purposes of illustration, it is not to be construed as limited thereby but is intended to include all reasonable variations and modifications within the scope and spirit of the described invention and the appended claims.

That which is claimed is:

1. A process for removing hydrogen sulfide from a fluid stream containing hydrogen sulfide and less than 500 ppm of free hydrogen comprising the step of contacting said fluid stream under suitable absorbing conditions with an absorbing composition consisting essentially of nickel oxide, alumina, and zinc oxide.

2. A process in accordance with claim 1 wherein the amount of alumina in said absorbing composition is in the range of about 10 weight-% to about 50 weight-%, said weight-% being expressed in terms of the alumina based upon the total weight of the absorbing composition.

3. A process in accordance with claim 2 wherein the amount of alumina is in the range of about 30 weight-% to about 40 weight-%.

4. A process in accordance with claim 1 wherein the amount of nickel oxide in said absorbing composition is in the range of about 0.1 weight-% to about 15 weight-%, said weight-% being expressed in terms of the nickel oxide based upon the total weight of the absorbing composition.

5. A process in accordance with claim 4 wherein the amount of nickel oxide is in the range of about 2.0 weight-% to about 7.5 weight-%.

6. A process in accordance with claim 5 wherein the amount of alumina in said absorbing composition is in the range of about 30 weight-% to about 40 weight-%, said weight-% being expressed in terms of the alumina based upon the total weight of the absorbing composition.

7. A process in accordance with claim 1 wherein said absorbing composition is prepared by a process comprising the steps of:
   a. mixing zinc oxide or a precursor of zinc oxide, alumina and nickel oxide or a precursor of nickel oxide to form a homogeneous mixture thereof;
   b. adding a dilute acid to said homogeneous mixture to form a peptized material;
   c. drying said peptized material; and,
   d. calcining the dried, peptized material to produce said absorbing composition.

8. A process in accordance with claim 7 wherein said precursor of zinc oxide is selected from the group consisting of zinc sulfide, zinc sulfate, zinc hydroxide, zinc carbonate, zinc acetate, and zinc nitrate; said precursor of nickel oxide is selected from the group consisting of nickel acetates, nickel carbonates, nickel nitrates, nickel sulfates, nickel thiocyanates, and mixtures of two or more thereof; said dilute acid is a dilute solution of an acid selected from the group consisting of nitric acid, acetic acid, sulfuric acid, and hydrochloric acid; the concentration of said acid in said dilute acid is in the range of about 1.0 weight-% to about 15 weight-% based upon the total weight of the dilute acid; said peptized material is dried at a temperature in the range of about 75° C. to about 300° C. for a period of time in the range of about 0.5 hour to about 4.0 hours; and, said dried, peptized material is calcined in the presence of oxygen at a temperature in the range of about 375° C. to about 750° C. for a period of time in the range of about 0.5 hour to about 4.0 hours.

9. A process in accordance with claim 6 wherein said absorbing composition is prepared by a process comprising the steps of:
   a. mixing zinc oxide, alumina, and nickel oxide or a precursor of nickel oxide to form a homogeneous mixture thereof;
   b. adding dilute acetic acid, having an acid concentration in the range of about 1.0 weight-% to about 5.0 weight-% based upon the total weight of the dilute acid, to said homogeneous mixture to form a peptized material;
   c. drying said said peptized material at a temperature in the range of about 90° C. to about 250° C. for a period of time in the range of about 1 hour to about 2 hours; and,
   d. calcining the dried, peptized material in the presence of free oxygen at a temperature in the range of about 500° C. to about 700° C for a period of time in the range of about 1 hour to about 2 hours to produce said absorbing composition.

10. A process in accordance with claim 9 wherein said suitable absorbing conditions comprise a temperature in the range of about 150° C. to about 600° C., a total system pressure in the range of about atmospheric to about 2000 psig, and a residence time for said fluid stream in the presence of said absorbing composition in the range of about 10 to about 10,000 volumes of gas at standard temperature and pressure per volume of said absorbing composition per hour.

11. A process in accordance with claim 1 wherein said composition is prepared by:
   a. mixing zinc oxide or a precursor of zinc oxide with alumina to form a homogeneous mixture thereof;
   b. adding a dilute acid to said homogeneous mixture to form a peptized material;
   c. drying said peptized material;
   d. calcining the dried, peptized material;
   e. adding nickel oxide or a precursor of nickel oxide to the calcined, peptized material to produce a promoted material;
   f. drying said promoted material; and,
   g. calcining the dried, promoted material to produce said composition.

12. A process in accordance with claim 11 wherein said precursor of zinc oxide is selected from the group consisting of zinc sulfide, zinc sulfate, zinc hydroxide, zinc carbonate, zinc acetate, and zinc nitrate; said dilute acid is a dilute solution of an acid selected from the group consisting of nitric acid, acetic acid, sulfuric acid, and hydrochloric acid; the concentration of said acid in said dilute acid is in the range of about 1.0 weight-% to about 15 weight-% based upon the total weight of the dilute acid; said peptized material is dried at a temperature in the range of about 75° C. to about 300° C. for a period of time in the range of about 0.5 hour to about 4.0 hours; said dried, peptized material is calcined in the presence of free oxygen at a temperature in the range of about 375° C. to about 750° C. for a period of time in the range of about 0.5 hour to about 4.0 hours; said precursor of nickel oxide is selected from the group consisting of nickel acetates, nickel carbonates, nickel nitrates, nickel sulfates, nickel thiocyanates, and mixtures of two or more thereof; said promoted material is dried at a temperature in the range of about 75° C. to about 300° C. for a period of time in the range of about 0.5 hour to about 8.0 hours; and, said dried, promoted material is calcined in the presence of free oxygen at a temperature in the range of about 375° C. to about 750° C for a period of time in the range of about 0.5 hour to about 4.0 hours 13. A process in accordance with claim 6 wherein said absorbing composition is prepared by a process comprising the steps of:
   a. mixing zinc oxide and alumina to form a homogeneous mixture thereof;
   b. adding dilute acetic acid, having an acid concentration in the range of about 1.0 weight-% to about 5.0 weight-% based upon the total weight of the dilute acid, to said homogeneous mixture to form a peptized material;
   c. drying said peptized material at a temperature in the range of about 90° C. to about 250° C. for a period of time in the range of about 1 hour to about 2 hours;
   d. calcining the dried, peptized material in the presence of free oxygen at a temperature in the range of about 500° C. to about 700° C for a period of time in the range of about 1 hour to about 2 hours;
   e. adding nickel oxide or a precursor of nickel oxide to the calcined, peptized material to produce a promoted material;
   f. drying the promoted material at a temperature in the range of about 90° C. to about 250° C. for a period of time in the range of about 3 hour to about 5 hours;
   g. calcining the dried, promoted material in the presence of free oxygen at a temperature in the range of about 500° C. to about 700° C. for a period of time in the range of about 1 hour to about 2 hours to produce said absorbing composition.

14. A process in accordance with claim 13 wherein said suitable absorbing conditions comprise a temperature in the range of about 150° C. to about 600° C., a total system pressure in the range of about atmospheric to about 2000 psig, and a residence time for said fluid stream in the presence of said absorbing composition in the range of about 10 to about 10,000 volumes of gas at standard temperature and pressure per volume of said absorbing composition per hour.

* * * * *

UNITED STATES PATENT AND TRADEMARK OFFICE
CERTIFICATE OF CORRECTION

PATENT NO. : 4,990,318
DATED : February 5, 1991
INVENTOR(S) : Dennis R. Kidd

It is certified that error appears in the above-identified patent and that said Letters Patent is hereby corrected as shown below:

At column 10, line 21 change "47.6" to --- 46.47.

At column 10, line 22 change "47.6" to --- 46.47 ---; and change "Al-0- to --- $Al_2O_3$ ---.

Signed and Sealed this

Third Day of August, 1993

Attest:

MICHAEL K. KIRK

Attesting Officer     Acting Commissioner of Patents and Trademarks